METHOD OF PRODUCTION OF LEAD SELENIDE PHOTODETECTOR CELLS

Filed Nov. 4, 1959 2 Sheets-Sheet 1

Bob Norman McLean,
INVENTOR.
BY John M. Koch
ATTORNEY.

Aug. 22, 1961 B. N. McLEAN 2,997,409

METHOD OF PRODUCTION OF LEAD SELENIDE PHOTODETECTOR CELLS

Filed Nov. 4, 1959 2 Sheets-Sheet 2

RELATIVE RESPONSE

Bob Norman McLean,
INVENTOR.

BY John M. Koch

ATTORNEY.

United States Patent Office 2,997,409

Patented Aug. 22, 1961

2,997,409

METHOD OF PRODUCTION OF LEAD SELENIDE PHOTODETECTOR CELLS

Bob N. McLean, Santa Barbara, Calif., assignor to Santa Barbara Research Center, Goleta, Calif., a corporation of California Filed Nov. 4, 1959, Ser. No. 850,925

12 Claims. (Cl. 117—201)

This invention relates to a method of producing lead selenide infrared detector cells and more particularly to such a method characterized by a high degree of reliability in the production of such cells relatively free of defects.

It is extremely important that the sensitive areas of infrared detector cells have a uniform response. When using prior art methods in preparing such cells, it frequently happens that the cells are defective and that they contain below level areas after oxidation of the lead selenide layer or film. Such low level areas frequently are so defective that they do not respond to infrared radiation. In addition, the resistance of a detector cell generally should be within a range of values which make the cell useful for various applications thereof. If the resistance of the cell is too high, means should be available for lowering it. On the other hand, if the resistance is too low, it is desirable to be able to increase the resistance without affecting the sensitivity of the cell.

Accordingly, it is an important object of this invention to provide a reliable method for producing lead selenide infrared detector cells of uniform, increased sensitivity.

Another object is to provide a method for controlling the resistance of a lead selenide photodetector cell.

Additional objects will become apparent from the following description which is given primarily for purposes of illustration and not limitation.

Briefly stated in general terms, the objects of this invention are attained by providing a method for the production of infrared detector cells, comprising applying a layer of lead selenide to a suitable substrate, oxidizing the applied layer of selenide at an elevated temperature, and applying a controlled amount of selenium to the oxidized layer of lead selenide. Any suitable method of applying selenium to the oxidized layer of lead selenide can be used. Included in such methods are: submergence of the oxidized layer of lead selenide in a decomposable selenium-bearing solution, subjecting the oxidized layer of lead selenide to a decomposable selenium-bearing vapor, impregnating the oxidized layer of lead selenide with a decomposable selenium-bearing solid material, including condensed selenium vapor, applied selenium powder, etc.

A more detailed description of a specific embodiment of my invention is given below with reference to the attached drawings, wherein.

Figure 1:
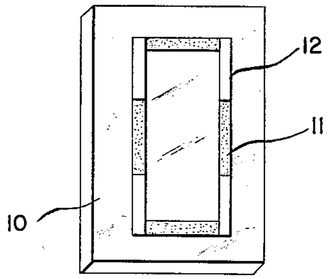
FIG. 1 is an isometric view showing a photodetector cell of the type which can be produced by the use of the present invention.

In acordance with a specific embodiment of my invention, an infrared detector cell for use at ambient temperatures is prepared as follows. A suitable substrate, such as a glass substrate 10, shown in FIG. 1, is thoroughly cleaned in accordance with procedures known in the art. The clean substrate is mounted in a suitable vessel, preferably in a manner so that the substrate can be heated to a desired elevated temperature. A deposition solution is then added to the vessel containing the substrate.

A suitable deposition solution is prepared by dissolving 16.6 grams of pure selenourea crystals in 450 mls. of boiling deionized water to thus prepare a 0.3 molar solution of selenourea. Carbon dioxide is bubbled through the deionized water for about 15 minutes or so just before the addition thereto of the selenourea. Thereafter, the solution is maintained at about 25° C. Next 512.1 grams of purified lead acetate crystals are dissolved in 900 milliliters of deionized water to produce a 1.5 molar solution. The resulting solution is maintained at about 30° C. About 15 mls. of the 0.3 molar selenourea solution are mixed with about 15 mls. of the 1.5 molar lead acetate solution. The lead to selenium ion ratio in this solution is about 5 to 1. The deposition solution preferably is mixed at least a minute before it is added to the deposition vessel.

The temperature of the substrate is in the range of about 25° to about 28° C. after the deposition solution has been added to the vessel. Heat is applied to the substrate while the deposition solution is stirred continuously for about two minutes. Thereafter, for the next 18 minutes stirring is programmed so as to be in effect for 10 seconds of each minute, the direction of stirring being reversed for each successive stirring period. During the 20 minute deposition period, the temperature of the substrate and the deposition solution is raised uniformly from about 25° to 28° C., at the commencement of deposition, to about 75 to about 90° C. at the end thereof.

The object is primarily to heat the substrate, rather than the deposition solution. The substrate temperature affects the rate of crystallization and the size of the crystals of the lead selenide deposited on the substrate. An excessively rapid rate of heating of the substrate causes the formation of large crystals having poor adherence to the substrate, while an undesirably low rate of heating results in the production of unacceptably thin films of lead selenide. Initially, the substrate should be heated at the rate of about 5° C. per minute for the first 5 to 15 minutes and about 1° C. per minute for the remainder of the 20-minute deposition period. Such a heating program results in a desirable and practical plating or deposition rate as the deposition solution becomes depleted. By heating the substrate, preferential crystallization of the lead selenide on the substrate, is achieved. It is important to maintain the temperature of the substrate slightly above that of the surface of the vessel to preferentially crystallize the lead selenide on the substrate.

The layer of lead selenide thus deposited provides a "seed" layer of lead selenide firmly adherent to the substrate upon which a relatively thicker layer of more sensitive lead selenide can be grown. After depositing this first lead selenide layer, the substrate and deposition vessel are thoroughly rinsed with deionized water. A second deposition solution is then added to the vessel containing the substrate. This second solution is prepared by dissolving 0.3 gram of gelatin powder in 25 mls. of boiling deionized water. About 1.25 grams of potassium iodide are dissolved first in 5 mls. of deionized water to which about 1.27 grams of iodine are added and dissolved. Thereafter about 20 mls. of deionized water are added to bring the potassium tri-iodide solution up to about 25 mls. This results in a 0.25 molar solution of potassium tri-iodide. Next, 1.5 mls. of the resulting gelatin potassium tri-iodide solution are mixed with 15 mls. of a 1.5 molar lead acetate solution prepared as described above. After this, 15 mls. of 0.3 molar selenourea solution, prepared as described above, are added. Finally, 1.5 mls. of the gelatin potassium tri-iodide solution are added. This results in a solution having a lead to iodide ion ratio of about 70 to 1. This resulting second solution is added to the vessel containing the substrate.

A second layer of lead selenide is deposited with this second solution by following the same heating and stirring program described above in connection with the deposition of the first layer. It will be understood that this second layer of lead selenide, upon the conclusion of the deposition thereof upon the first layer, is indistinguishable from the first layer because the two layers combine to form a single integral layer of lead selenide. The ultimate thickness of the resulting layer or film of polycrystalline lead selenide is slightly over about 1 micron.

The resulting layer of lead selenide is sensitized by placing the structure on glass-walled pads in open dishes in a furnace and heating in an air atmosphere for approximately 10 minutes. The furnace temperature is not critical but should be maintained in a preferred range between about 350° and about 450° C. The resulting cells are exposed to iodine or bromine vapors for approximately seven seconds. This exposure to halide vapors appears to result in cells having more stable characteristics, such as resistivity, which increases between about 1 to 3 orders of magnitude during the exposure period and remains constant thereafter.

The detector cells thus produced are additionally sensitized by being submerged for about 10 minutes in a 0.3 molar aqueous selenourea solution retained in a dish open to the atmosphere. It is believed that selenium from the selenourea solution deposits over the photosensitive areas of the cell and results in the incorporation in the cell of uniform positive and reliable sensitivities in all of the areas of the cell. The resulting detector cell is then dried in the atmosphere for about 30 minutes. Finally, the detector cell is thoroughly washed with deionized or distilled water and again dried in air at room or ambient temperatures.

It will be understood that although the method of my invention was described above in connection with a particular method of producing a cell for use at ambient temperatures, my invention is not limited to the production of cells by such particular method, nor only to cells produced for use at ambient temperatures. Instead, the method of my invention is applicable to lead selenide cells produced by methods in general wherein the lead selenide film is oxidized during the performance of the method, and to methods for producing cells for use at reduced temperatures or elevated temperatures as well as at ambient temperatures.

For example, an infrared detector cell for use at reduced temperatures, such as the temperatures of liquid nitrogen or of other liquefied gases can be prepared as follows. The lead selenide layer is deposited upon the properly prepared substrate by the use of only the second solution, that is, the gelatin-potassium tri-iodide-lead acetate-selenourea deposition solution, described above in connection with the description of the method for preparing the detector cell for use at ambient temperatures. The deposition steps and the heating and stirring program used are substantially the same as described in the above-described method. After the initial deposition has been completed and the vessel and substrate have been rinsed with purified water, a second deposition is produced with the same "gelatin" solution used for the first deposition. Substantially the same steps and heating and stirring program are used for this second deposition as for the first. The resultant film of polycrystalline lead selenide is slightly less than one micron thick. The cell thus prepared is sensitized by heating in air for about 12 minutes between about 350° and about 450° C., as described hereinabove. The heated cell is treated by submergence for about 10 minutes in a 0.3 molar aqueous selenourea solution, air-dried for about 30 minutes, washed with purified water and dried at ambient temperatures, also as described above.

As shown in FIG. 1, the infrared detector cell comprises a glass substrate 10 upon which is deposited the lead selenide layer 11 with the aid of masks. The deposited lead selenide layer 11 is provided with four electrical contacts 12. The electrical contacts 12 are readily formed by evaporating gold directly onto the glass substrate 10 by the use of conventional methods and apparatus known in the art.

Figure 2:
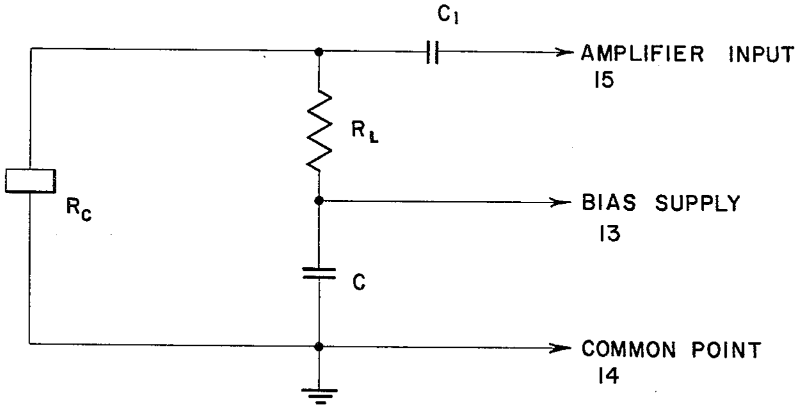
FIG. 2 is a schematic diagram showing a detector cell of the invention connected in a circuit.

In operation, the infrared detector cell is connected in suitable circuitry as shown in FIG. 2 through the electrical contacts 12. In the circuit diagram of FIG. 2, $R_c$ represents the infrared detector cell and $R_L$ denotes a load resistor. A suitable source of direct current (not shown) is connected between the bias supply terminal indicated at 13 and the common point terminal indicated at 14. Capacitor $C_1$ is provided for D.C. blocking and signal coupling to the amplifier (not shown) through the amplifier input terminal indicated at 15. Capacitor C effectively bypasses the bias supply at signal frequencies. Resistance $R_L$ generally, but not necessarily, is comparable in value to that of the cell $R_c$. The purpose of the resistance $R_L$ is to provide a D.C. path for the necessary bias current through the cell $R_c$, while at the same time offering a high shunt impedance to signal voltages impressed upon the amplifier for ultimate utilization. Impedance changes in the cell $R_c$ are brought about by the impingement of radial energy, such as infrared radiation, upon the lead selenide film 11 while it is exposed to the radiation.

Figure 3:
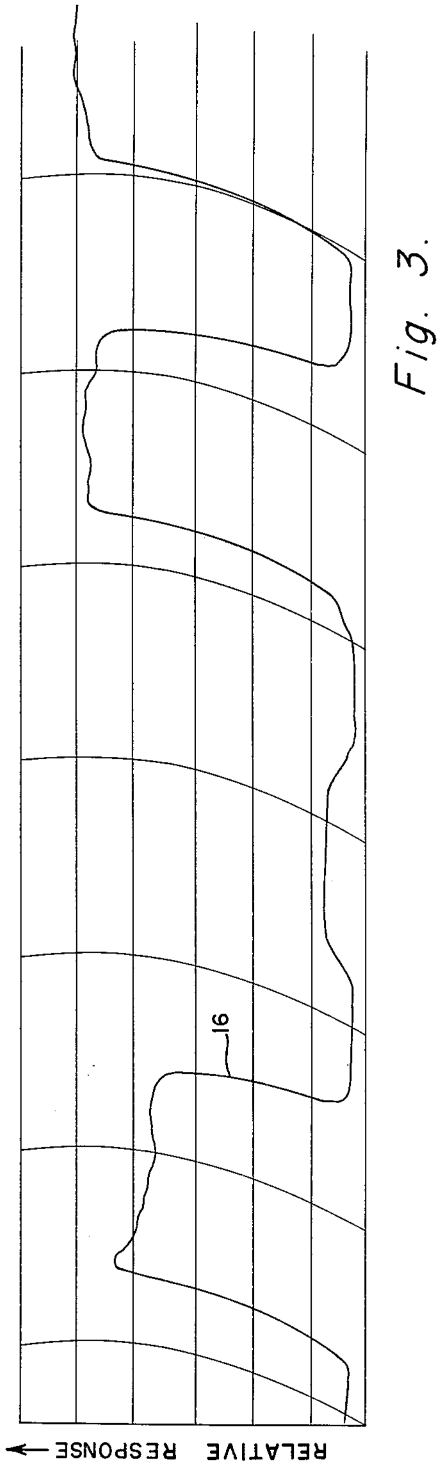
FIG. 3 is a graph showing a response curve of a lead selenide cell having four areas, one of which is relatively insensitive.
Figure 4:
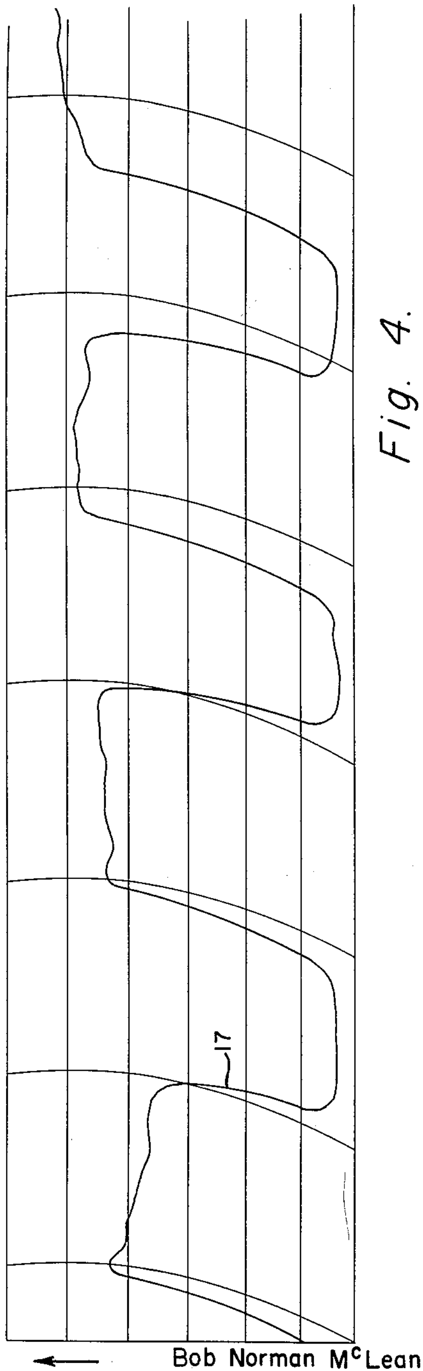
FIG. 4 is a similar graph showing the response curve of a lead selenide cell having four areas each of which is suitably sensitized.

The response of the detector cell is determined and measured by electronic means well-known in the art. FIGS. 3 and 4 show reproductions of two responsivity curves 16 and 17, respectively, of cells divided into four sensing areas. Curve 16 of FIG. 3 presents the detector cell responsivity of a cell manufactured in accordance with prior art procedures. Curves 17 of FIG. 4, on the other hand, shows a responsivity curve of a detector cell manufactured in accordance with the method of my invention. It will be clearly observed that curve 17 of FIG. 4 shows a response which is many times higher than that of the cell shown in FIG. 3. In addition, all four of the quadrants of the cell manufactured in accordance with the method of my invention, and represented by curve 17 of FIG. 4, are fully responsive to infrared radiation; whereas, the cell represented by curve 16 of FIG. 3 includes one quadrant which is almost totally nonresponsive to infrared radiation.

It is, of course, important that the sensitive area of a detector cell have a uniform response. In a curve of detector cells produced in accordance with prior art methods of production thereof there will be found cells having dead or below level quadrants or other areas in the detector cell after it has been oxidized in the atmosphere at elevated temperatures. Such dead or below level areas will, of course, not respond properly to infrared radiation. One such typical example of a low sensitive quadrant is shown, as pointed out above, in the second portion of curve 16 shown in FIG. 3.

It has been found, and this also is a feature of my invention, that such defective cells can be salvaged in accordance with one embodiment of my invention. Namely, such defective cells can be made fully responsive with all quadrants or areas thereof made sensitive to infrared radiation by completely submerging, for about 10 minutes, such defective cells in a 0.3 molar aqueous selenourea solution maintained in a dish open to the atmosphere. As pointed out above, it is believed that selenium from the selenourea deposits over the photosensitive areas of the cell and corrects any deficiencies therein. As a result, such defective cells are rendered completely effective by properly sensitizing the areas of the cell for the detection of infrared radiation. Also as pointed out above, such submerged cells are dried in the atmosphere for 30 minutes and are then thoroughly washed with deionized or distilled water and again dried in air at room or ambient temperatures.

The sensitization of defective cells can be illustrated as follows. The signal of a typical detector cell prepared in accordance with prior art methods showed a response of 13 microvolts at 4.4 microns. This responsivity was unsatisfactorily low. After treatment of this defective cell in accordance with the method of my invention given above, this cell showed a response of 45 microvolts at 4.4 microns. The resulting response raised the signal to a level which can be utilized more effectively in an infrared system. Because of the increased signal level resulting from the additional treatment in accordance with the method of my invention, the cell reacted satisfactorily to low temperature radar energy.

The sensitivity of a cooled lead selenide infrared detector cell is greatly improved by the use of the method of my invention. For example, an infrared detector cell made in accordance with prior art methods had a D* value (which is a measure of detector cell sensitivity conventionally used in the art) of $4\times10^7$ when tested at liquid nitrogen temperatures (about −196° C.). After treating this cell by submerging it in a 0.3 molar aqueous selenourea solution for 60 minutes at ambient temperatures, drying, washing with purified water and drying as described above, it had a D* value when measured at the same conditions as before treatment of $3.8\times10^9$. This represents an improvement of approximately a hundredfold. For both measurements the black body temperature was 500° K., the chopping frequency was 840 c.p.s. and the bandwidth was 1.

The resistance of a detector cell should be within a range that can be utilized for the various applications of the cell. If the resistance of the cell is too high, it is desirable to have a method to lower it, and if the resistance of the cell is too low, it naturally also is advantageous to be able to increase the resistance of the cell without affecting its sensitivity.

In another embodiment of my invention, the resistivity of an infrared detector cell can be controlled by treating the cell having an undesirably low or an unsatisfactorily high resistance to impart to the cell a resistance of the desired magnitude. This can be accomplished by submerging the cell in a 0.3 molar aqueous selenourea solution, drying the resulting submerged cell, and water-washing and again drying the cell as pointed out above. For example, a detector cell which had a resistance in a range of 80 megohms was lowered to 1 megohm by submerging the detector cell for 40 minutes in a 0.3 molar aqueous solution of selenourea and drying, washing and drying the submerged cell as described above. Another detector cell which had a resistance that was too low, namely, 0.7 megohm, was increased to 1.0 megohm by treating the detector cell in the same manner as outlined above, except that the selenourea treatment was for a period of 10 minutes.

It will be seen that the advantages of the various embodiments of my invention reside in the fact that detector cells which are produced, salvaged, or resistance controlled by my method, have increased sensitivity, greater uniformity of properties and resistance of a desired magnitude.

My invention has been illustrated and described above in connection with the use of a 0.3 molar aqueous solution of selenourea. Other concentrations of aqueous selenourea can, of course, be used. In general, dilute solutions are preferred because the time of treating the lead selenide layer is of convenient duration of the order of several minutes and can, therefore, be conveniently controlled to obtain reproducible results. Solvents other than water can be used. Water is, however, convenient because it is stable, easily purified, low in cost and non-toxic.

The oxidized lead selenide layer of an infrared detector cell, before being treated by the method of my invention, generally is yellow in color. After treatment with a dilute solution of selenourea, as described above, the lead selenide layer is reddish. The reddish color apparently is due to a small amount of deposited red, elemental selenium. The selenourea decomposes during the treatment so that free selenium is believed to be formed and deposited on the lead selenide layer in a small, controlled amount. Such controlled amounts of free selenium can be applied to the oxidized lead selenide layer by the use of decomposable selenium compounds other than selenourea.

For example, the lead selenide layer can be treated with a selenium bearing gas, such as hydrogen selenide, vaporized selenium dioxide, etc., under conditions which result in the decomposition of the gas to deposit free selenium on the lead selenide layer. These gaseous selenium compounds have been found to improve the infrared sensitivity of oxidized lead selenide layers in a manner similar to that observed when the lead selenide was submerged in a dilute aqueous solution of selenourea, as describe hereinabove. Similarly, the desired amount of selenium can be deposited upon the lead selenide layer by directly evaporating free selenium upon the layer under controlled conditions. In addition, the selenium can be deposited on the lead selenide layer by reacting a selenium-bearing compound with a reagent which will produce free selenium. Alternatively, the desired amount of sensitizing selenium can be deposited on the lead selenide film or layer at the time that it is being oxidized to prepare the infrared detector cell. This can be accomplished by vaporizing a selenium powder into the thin lead selenide film at the same time that it is being oxidized at an elevated temperature. This eliminates one step from the method of producing thin film lead selenide detector cells. Thus, by the use of various decomposable selenium-bearing compounds, including free selenium, and by varying the temperature, concentration and time of exposure to selenium, one can control the sensitivity and resistance of a lead selenide detector cell by the use of my invention.

It will be apparent that many variations in the materials, combinations of materials and methods of constructing the composite cell of my invention will occur to a person skilled in the art. The materials and methods given hereinabove are presented primarily for descriptive and illustrative purposes and I intend my invention to be limited only by the scope of the appended claims.

What is claimed is:

1. In a method for the preparation of an infrared detector cell including a sensitization step involving oxidation of a lead selenide layer, the improvement comprising treating the lead selenide layer with selenourea.

2. The method of preparing an infrared detector cell comprising applying a layer of lead selenide to a substrate, oxidizing the applied layer of lead selenide, and treating the lead selenide layer with selenourea.

3. A method of sensitizing a defective lead selenide cell having uneven sensitivity to infrared radiation comprising treating the lead selenide layer with selenourea.

4. A method of controlling the resistance of an infrared lead selenide detector cell comprising treating the lead selenide layer of the cell with selenourea.

5. In a method for the preparation of an infrared detector cell including a sensitization step involving oxidation of a lead selenide layer, the improvement comprising treating the lead selenide layer with an aqueous solution of selenourea.

6. The method of preparing an infrared detector cell comprising applying a layer of lead selenide to a substrate, oxidizing the applied layer of lead selenide, and treating the lead selenide layer with an aqueous solution of selenourea.

7. A method of sensitizing a defective lead selenide cell having uneven sensitivity to infrared radiation comprising treating the lead selenide layer with an aqueous solution of selenourea.

8. A method of controlling the resistance of an infrared lead selenide detector cell comprising treating the lead selenide layer of the cell with an aqueous solution of selenourea.

9. In a method for the preparation of an infrared detector cell including a sensitization step involving oxidation of a lead selenide layer, the improvement comprising treating the lead selenide layer with an aqueous solution of selenourea, drying the treated lead selenide layer, water-washing the dried layer and drying the washed layer.

10. The method of preparing an infrared detector cell comprising applying a layer of lead selenide to a substrate, oxidizing the applied layer of lead selenide, treating the lead selenide layer with an aqueous solution of selenourea, drying the treated lead selenide layer, water-washing the dried layer and drying the washed layer.

11. A method of sensitizing a defective lead selenide cell having uneven sensitivity to infrared radiation comprising treating the lead selenide layer of the cell with an aqueous solution of selenourea, drying the treated lead selenide layer, water-washing the dried layer and drying the washed layer.

12. A method of sensitizing a defective lead selenide cell having uneven sensitivity to infrared radiation comprising treating the lead selenide layer of the cell with an approximately 0.3 molar aqueous solution of selenourea, drying the treated lead selenide layer, water-washing the dried layer and drying the washed layer.

References Cited in the file of this patent

UNITED STATES PATENTS

| | | |
|---|---|---|
| 2,408,116 | Von Hippel | Sept. 24, 1946 |
| 2,898,240 | Owen | Aug. 4, 1959 |

FOREIGN PATENTS

| | | |
|---|---|---|
| 1,054,606 | Germany | Apr. 9, 1959 |

OTHER REFERENCES

Zingaro et al.: J. Org. Chem., volume 18, pages 292–296 (1953).